May 26, 1931. H. P. MINER 1,807,542
AIRSHIP
Original Filed June 13, 1929  2 Sheets-Sheet 2
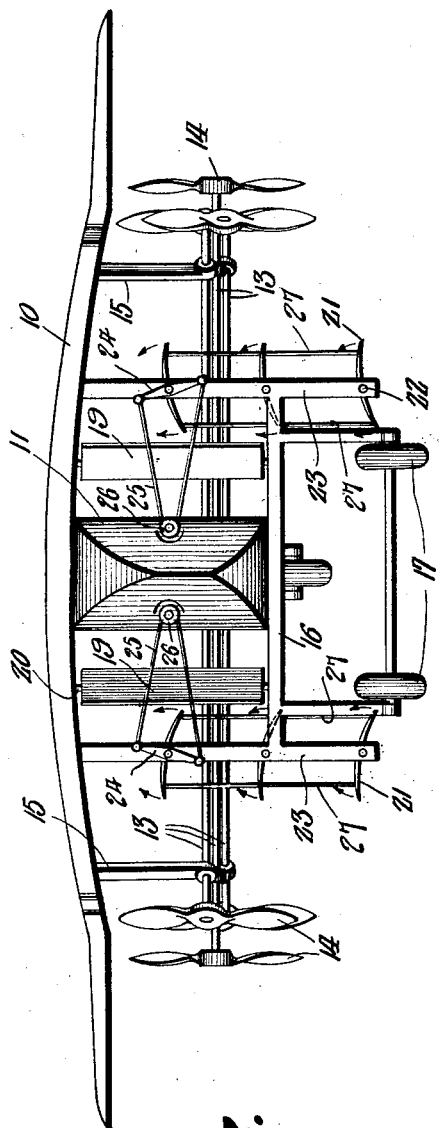
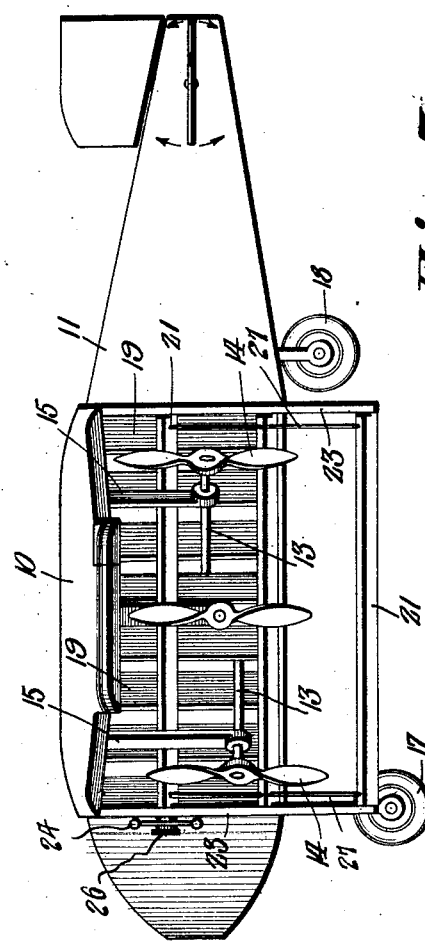
H. P. Miner, Inventor Patented May 26, 1931

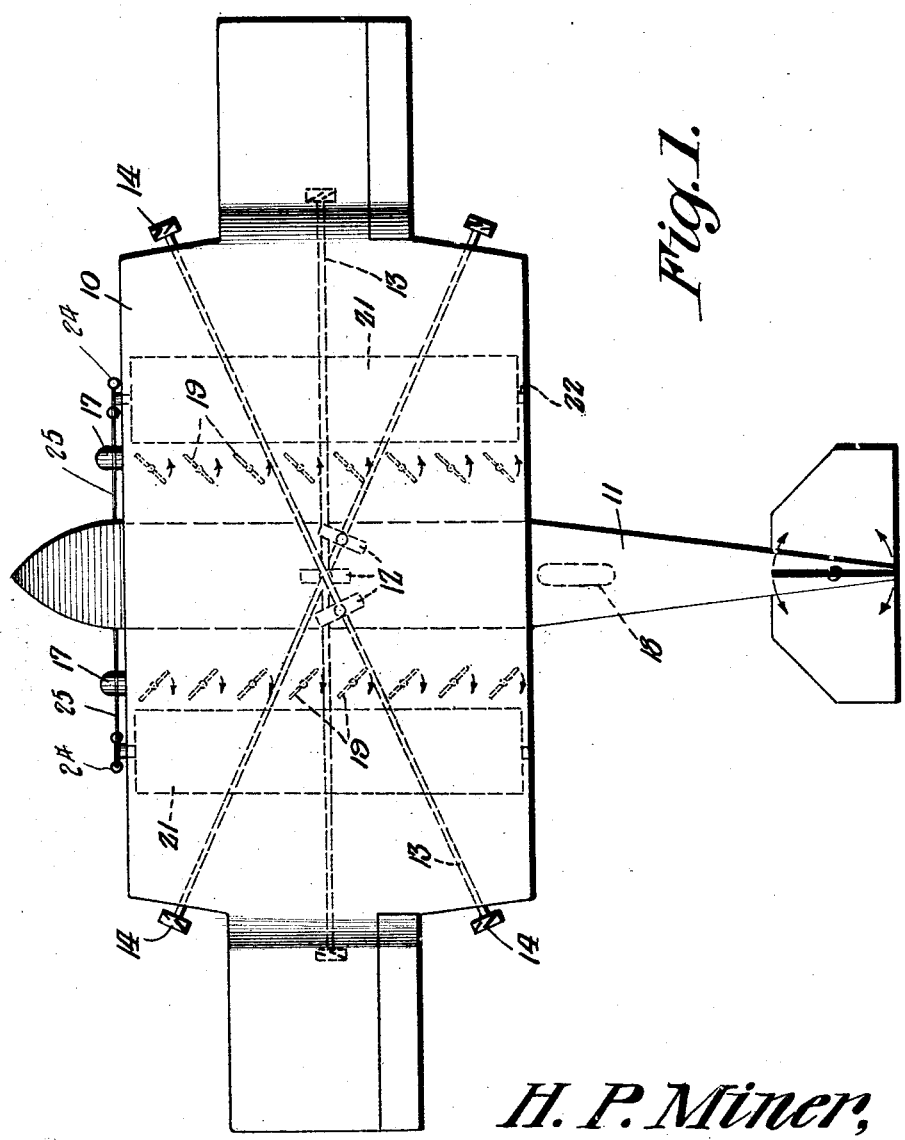

1,807,542

UNITED STATES PATENT OFFICE

HIRAM P. MINER, OF MISSION RIDGE, SOUTH DAKOTA

AIRSHIP

Application filed June 13, 1929, Serial No. 370,576. Renewed October 16, 1930.

This invention relates to an airship.

It generally aims to provide a construction which will add safety to aerial navigation, and be capable of manufacture and upkeep at minimum cost.

In addition I aim to provide a construction in which the air current will be at right angles to the line of flight, in which the air current will act on vanes to propel the plane and in view of the fact that they are at right angles to the line of flight thereby cause upward pressure to support the plane, to provide the ship with adjustable elevating wings having axes parallel to the line of flight, thereby overcoming resistance to a great extent when in motion and also making it possible to maintain the plane on a more level keel and allow the main wing or top to pass through the air with less resistance, to provide one or more pairs of elevating or carrying wings, to provide the body of the plane or cabin with vertical sides to oppose the air stream forcing a greater part of it upward against the main wing, a multiplicity of motors having their propeller shafts in cross relation so as to preserve balance irrespective of the stopping of one of the engines and to provide a construction which will take off or ascend or descend vertically and in a space no larger than its greatest spread.

Various additional objects and advantages will become apparent from a consideration of the description following taken in connection with accompanying drawings illustrating an operative embodiment.

In said drawings:—

Figure 1 is a plan view of the airship,

Figure 2 is a front elevation thereof, and

Figure 3 is a side elevation.

Referring specifically to the drawings, the airship has a main plane at 10 above the fuselage or cabin 11 and projecting to opposite sides thereof.

The fuselage 11 carries any desired number of propelling motors for instance three as shown in Figure 1 at 12. Each motor 12 drives a shaft 13 extending transversely of the fuselage 11 to opposite sides thereof, said shafts being arranged in crossed relation on different horizontal planes and at each of their ends are equipped with a propeller 14 whose mountings are supplemented by hangers or bearings 15 depending from the plane 10. Thus six propellers are used, operated by three motors and so arranged that in the event one motor becomes disabled, the others may nevertheless continue to operate and the disability of one will not overbalance the airship.

The airship has a skeleton framework 16 fastened to the plane 10 and the cabin or fuselage 11. Ground wheels 17 and 18 are carried by such frame 16 and by the fuselage 11.

It will be noted that the sides of the cabin or fuselage are vertical and relatively close thereto and opposite each side thereof, is a row of propelling fins or vanes 19 pivotally mounted by trunnions 20 on the frame 16 and plane 10. Suitable means, unnecessary to show in detail, are provided for operating the vanes 19 in unison, in order to vary their angle. Such means may consist of pinions on the trunnions 20 in connection with a rack bar suitably guided and adapted to be locked in its different adjusted positions.

Adjacent the vanes 19, which operate on vertical axes, are vertical rows of angle lifting and supporting planes 21 which are disposed one above the other and which have trunnions 22 pivotally mounted in upright members 23 of the frame 16. These auxiliary planes 21 may be adjusted at an angle in any desired way and for instance by means such as suggested for the vanes 19.

In Figure 2 is shown a means for adjusting the lifting and supporting planes 21 and consisting of a rocker arm 24 secured to one of the trunnions 22 of each set of planes and having a flexible member 25 terminally engaging the opposite ends of each arm and trained around a sheave or pulley 26, said pulleys being adapted to be actuated in any suitable manner, not shown. 27 indicates flexible members connecting the planes of each set and on opposite sides of the respective fulcrums 22 to simultaneously adjust the connected planes. It will be apparent that if it is found desirable to do so that the two pulleys 26 may be mounted on a single shaft or a double pulley or its equivalent may be provided so that simultaneous adjustment of all of the planes 21 may be effected.

In order to show the direction of the air stream in operation, various arrows have been used in the drawings.

Various changes may be resorted to provided they fall within the spirit and scope of the invention.

I claim as my invention:—

1. An airship comprising a plane, a cabin below the same, propeller shafts radiating from the cabin, individual means to operate the propeller shafts, propellers driven by the shafts and arranged in pairs substantially concentric with the center from which the shafts radiate, and bearings depending from the plane in which said shafts are journaled.

2. An airship comprising a plane, a cabin below the same, propeller shafts radiating from the cabin, individual means to operate the propeller shafts, propellers driven by the shafts and arranged in pairs substantially concentric with the center from which the shafts radiate, bearings depending from the plane in which said shafts are journaled, a frame secured to the plane and said cabin, adjustable lifting and supporting planes carried by the frame, and propelling vanes carried by the frame.

3. An airship comprising a fuselage having vertical side walls, a plane fastened to the fuselage, a frame fastened to the under surface of the fuselage and having upright portions fastened to the plane, ground engaging wheels carried by the frame and the fuselage, shafts radiating from the fuselage, propellers on said shafts, individual means within the fuselage to drive the shafts, bearings for the shafts depending from the plane, horizontal rows of adjustable propelling fins relatively close to the opposite sides of the fuselage, and vertical rows of adjustable auxiliary lifting and supporting planes carried by said uprights.

In testimony whereof I affix my signature.

HIRAM P. MINER.